(12) United States Patent
Eftekhari et al.

(10) Patent No.: US 11,601,485 B2
(45) Date of Patent: Mar. 7, 2023

(54) INSTANT CONFERENCING SYSTEM

(71) Applicant: Intuit Inc., Mountain View, CA (US)

(72) Inventors: Amir Eftekhari, San Diego, CA (US); Roger C. Meike, Mountain View, CA (US); Radya Cherkaoui, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/334,627

(22) Filed: May 28, 2021

(65) Prior Publication Data
US 2022/0385704 A1 Dec. 1, 2022

(51) Int. Cl.
*H04L 65/403* (2022.01)
*H04L 65/1069* (2022.01)
*H04L 67/146* (2022.01)

(52) U.S. Cl.
CPC ........ *H04L 65/403* (2013.01); *H04L 65/1069* (2013.01); *H04L 67/146* (2013.01)

(58) Field of Classification Search
CPC .. H04L 65/403; H04L 65/1069; H04L 67/146
USPC ........................................................ 709/204
See application file for complete search history.

(56) References Cited

U.S. PATENT DOCUMENTS

| | | | | |
|---|---|---|---|---|
| 6,148,068 | A * | 11/2000 | Lowery | H04M 3/567 379/202.01 |
| 6,304,648 | B1 * | 10/2001 | Chang | H04M 3/569 379/202.01 |
| 8,194,837 | B1 * | 6/2012 | Weinman | H04M 3/42195 379/201.1 |
| 2002/0114432 | A1 * | 8/2002 | Shaffer | H04M 3/523 379/90.01 |
| 2003/0191676 | A1 * | 10/2003 | Templeton | G06Q 10/0631 705/7.19 |
| 2007/0185957 | A1 * | 8/2007 | Mandalia | H04L 65/4007 709/204 |
| 2011/0153735 | A1 * | 6/2011 | Eisenberg | H04M 3/567 709/203 |

(Continued)

OTHER PUBLICATIONS

Tovingmarget, How to act on "Meeting has started" notifications if I didn't click onWindows 10 notification, Mar. 3, 2020, https://techcommunity.microsoft.com/, https://techcommunity.microsoft.com/t5/microsoft-teams/how-to-act-on-quot-meeting-has-started-quot-notifications-if-i/m-p/1206686 (Year: 2020).*

*Primary Examiner* — Zi Ye
(74) *Attorney, Agent, or Firm* — Ferguson Braswell Fraser Kubasta PC

(57) ABSTRACT

A method including receiving, at a platform and from a first user using a first user device, selection of a uniform resource indicator (URI) unique to a second user using a second user device. The method also includes generating, automatically by the platform in response to receiving the URI, a conference session unique to the first user and the second user. The method also includes transmitting, automatically by the platform, a message to the second user, the message indicating that the conference session is initiated. The method also includes receiving, by the platform, an indication from the second user device that the second user joins the conference session. The method also includes joining, automatically by the platform, the first user device and the second user device in the conference session.

12 Claims, 15 Drawing Sheets

(56) References Cited

U.S. PATENT DOCUMENTS

2012/0287228 A1* 11/2012 Mishra .................. H04L 65/403
348/14.09
2014/0313282 A1* 10/2014 Ma ........................ H04N 7/141
348/14.09

* cited by examiner

Wisely Finance

─ 518

Help tee up your request with this info    Why these questions

Business hours    Contact

- Select Services
- Questions
- Connect or Schedule

| Angela Swanson |
| In 2 weeks |
| Maybe |
| Just me |

Back    Continue

*FIG. 5D*

INSTANT CONFERENCING SYSTEM

BACKGROUND

Conferencing is a common form of communication for individuals and businesses. Various video and audio conferencing platforms may be used to schedule communication between two or more users.

SUMMARY

The one or more embodiments provide for a method. The method includes receiving, at a platform and from a first user using a first user device, selection of a uniform resource indicator (URI) unique to a second user using a second user device. The method also includes generating, automatically by the platform in response to receiving the URI, a conference session unique to the first user and the second user. The method also includes transmitting, automatically by the platform, a message to the second user, the message indicating that the conference session is initiated. The method also includes receiving, by the platform, an indication from the second user device that the second user joins the conference session. The method also includes joining, automatically by the platform, the first user device and the second user device in the conference session.

The one or more embodiments provide for another method. The method includes receiving, at a platform and from a first user using a first user device, selection of a uniform resource indicator (URI) unique to a second user using a second user device. The method also includes generating, automatically by the platform in response to receiving the URI, a first conference session unique to the first user and the second user. The method also includes transmitting, automatically by the platform, a message to the second user, the message indicating that the first conference session is initiated. The method also includes responsive to receiving an event from the second user, transmitting automatically from the platform to the first user device a scheduling calendar including a selection of times available to the second user. The method also includes receiving, from the first user device, a selection of a selected time on the scheduling calendar. The method also includes joining, automatically by the platform, the first user device and the second user device in a second conference session at the selected time.

The one or more embodiments also provide for a system. The system includes a server and a data repository in communication with the server. The data repository stores a uniform resource indicator (URI) unique to a second user operating a second user device. A first user operating a first user device is different than the second user. The system also includes computer readable program code for generating a plurality of conference sessions, including a conference session unique to the first user and the second user. The computer readable program code also includes a message indicating that the conference session is initiated. The computer readable program code also includes an indication from the second user device of the second user that the second user joins the conference session. The system also includes a platform executable by the server to receive from the first user device a selection of the URI. The platform is also executable to generate, in response to receiving the selection of the URI, the conference session. The platform is also executable to transmit the message to the second user. The platform is also executable to receive the indication. The platform is also executable to join the first user device and the second user device in the conference session.

Other aspects of the one or more embodiments will be apparent from the following description and the appended claims.

BRIEF DESCRIPTION OF DRAWINGS

FIG. 5A, FIG. 5B, FIG. 5C, FIG. 5D, FIG. 5E, FIG. 5F, FIG. 5G, FIG. 5H, FIG. 5I, and FIG. 5J show exemplary screenshots of an instant conferencing system in use, in accordance with one or more embodiments.

DETAILED DESCRIPTION

Figure 1:
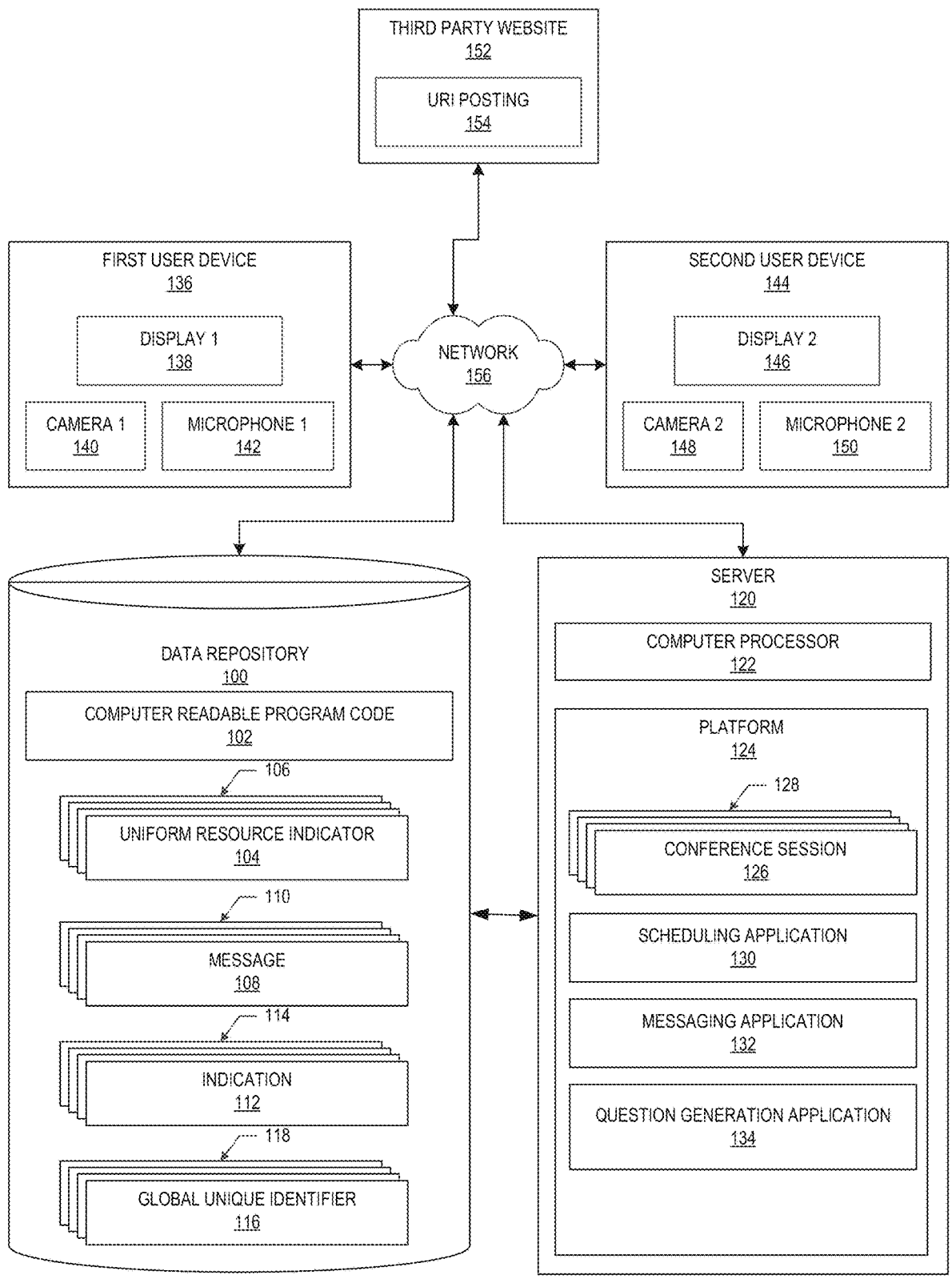
FIG. 1 shows a computing system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities. An entity is an electronic device, not necessarily limited to a computer.

In general, one or more embodiments relate to instant conferencing without use of platform-specific software. The term "instant," in the context of the one or more embodiments, is defined as unscheduled, not necessarily happening at a speed a human would perceive as rapidly or suddenly in time.

Conferencing of all types is growing rapidly. Small businesses, especially in service industries that market expert advice, use video conferencing to view the customer's environment, as well as to benefit from a simulated face-to-face dynamic, while saving time spent traveling to the customer's physical location. Video conferencing also is useful for maintaining so-called "social distancing" to reduce the transmission of infectious diseases.

Conferencing faces one or more technical challenges in establishing instant conferencing sessions in a platform-independent environment. Tools such as FACETIME® work only if both parties are on APPLE® products (i.e., the conferencing system is not platform independent, as both parties must use the common APPLE® platform). Additionally, such platform-dependent conference systems provide few or no tools to perform collaboration or commerce. Enterprise video conference platforms, such as ZOOM®, require that coordination and contact to occur separately. In other words, such platforms require that the meeting be scheduled and started separately. For example, even if the conference occurs very soon in time after scheduling, the generation of the schedule must be performed before implementing the video conference in order to generate the link additional users must have to enter the video conference session.

One or more embodiments address these and other technical issues with one or more of the technical solutions described herein. To be more explicit, the technical problem generally is creating a platform-independent, instant conferencing system.

A summary of the technical solution is as follows. The one or more embodiments provide for the establishment of a "virtual front door" in the form of a uniform resource indicator ("URI"). A URI is a sequence of characters that identifies a logical or physical resource used by web technologies. An example of a URI is a URL (uniform resource locator). The URI is permanent, or semi-permanent, and may be used by potentially many different users across many platforms to initiate a conference system with the owner of the URI.

As used herein, the term "own" is interpreted as being assigned-to, as well as full ownership of the URI. Thus, for example, the platform may initially assign a URI to a second user (e.g. a business) as part of a user agreement. The true owner of the URI may be the entity that operates the platform (such as the platform (124) in FIG. 1). However, because the platform has assigned unique use of the URI to the second user, the second user is deemed to be the "owner" of the URI for purposes of the one or more embodiments. Additionally, it is possible that the second user is the true owner of the URI, having purchased the URI and possibly even transmitted the URI to the platform for the platform to use. In either case, the second user (e.g., the business) is the "owner" of the URI for purposes of the one or more embodiments.

The URI provides the remote user (e.g., a customer) a distinct and unique means to begin a conferencing session with the URI owner (e.g., a business). Note that while a single URI is used, the one or more embodiments ensure that distinct and secure video or audio conferencing sessions are established for each remote user that uses the URI to request a conferencing session with the owner of the URI. The one or more embodiments also provide for a platform that receives activation of the URI and instantly establishes a conference session.

Thus, one or more embodiments are both platform-independent and instant. Again, the term "instant" refers to establishing a conference session without scheduling, not necessarily establishing the conference session at a particular time or speed. Accordingly, the one or more embodiments allow anonymous parties never having engaged previously (e.g., via social network or enterprise platforms, or via platform dependent systems) to begin an instant conferencing system.

Additionally, the one or more embodiments may include other features. For example, the one or more embodiments may provide for allowing a remote user to leave a video message, to write a brief explanation, to schedule an appointment, to provide photos, to conduct business transactions, etc.

Attention is now turned to the figures. FIG. 1 shows a computing system, in accordance with one or more embodiments. The computing system includes a data repository (100). The data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) may also store computer readable program code (102). In one or more embodiments, the computer readable program code (102) is machine-readable code which, when executed, perform the one or more methods described with respect to FIG. 2 and FIG. 3, and may be used to implement the examples described with respect to FIG. 4 and FIG. 5A through FIG. 5J on a computer or a virtualized computer system. The computer readable program code (102) may be logically distinct program code snippets and/or objects that interact with each other. Additionally, the computer readable program code (102) may be implemented in the form of software, hardware, or firmware, such as an application programming interface (API) or an application specific integrated circuit (ASIC).

The data repository (100) also stores a uniform resource indicator (104) among possibly multiple uniform resource indicators (106). The uniform resource link (104) may also be referred-to as a "URI" and the multiple uniform resource indicators (106) may be referred-to as multiple "URIs". In one or more embodiments, the uniform resource indicator (104) is a location or address identifying where documents or programs may be found on the Internet or other wide area network (WAN). The uniform resource indicator (104) may be characterized as a reference to a web resource that specifies the location of the web resource on a computer network and a mechanism for retrieving the web resource. One or more embodiments contemplate that the term "uniform resource indicator" (104), or URI, also contemplates other types of indicators, such as uniform resource locators (URLs), file transfer (FTP) links, email addresses, database addresses (e.g., JDBC), etc.

In one or more embodiments, each uniform resource indicator (104) in the multiple uniform resource indicators (106) is unique to a specific user. Thus, for example, the uniform resource indicator (104) is unique to a second user device (144) described below. Accordingly, when multiple uniform resource indicators (106) are present, each refers to a different user device and possibly a different user. As an example, the uniform resource indicator (104) is a unique URI assigned to a business operating the second user device (144).

The data repository (100) also stores a message (108) among possibly multiple messages (110). As used herein, the term "message" is defined as an electronic communication from a platform (124), described below, to a second user device (144), also described below. The message (108) communicates to the second user device (144) that a platform has initiated a conference session (126), described below. In an example, the message (108) is an electronic message that informs a business (i.e., the second user device (144)) that the conference session (126) has been established as a result of a customer (i.e., the first user device (136)) activating the uniform resource indicator (104).

The data repository (100) also stores an indication (112) among multiple indications (114). The indication (112) is an electronic communication between the second user device (144), described below, to the platform (124) (also described below). In particular, the indication (112) informs the platform (124) that the second user device (144) is attempting to join a conference session (126). Thus, for example, the indication (112) is an electronic communication from a business (i.e., the second user device (144)) that the business is attempting to join a conference session (126) established for a customer (i.e., the first user device (136)) after the customer activated the uniform resource indicator (104). Because the platform (124) may support multiple conference sessions concurrently, there may be multiple indications (114).

The data repository (100) also stores a global unique identifier (116), also referred-to as a "GUID". The global unique identifier (116) is an alphanumeric number or other unique identifier that is assigned to a conference session (126), described below. The global unique identifier (116) is used to separately identify and track different ones of the multiple conference sessions (128). Thus, any given conference session (126) has a corresponding global unique identifier (116) (GUID).

The system shown in FIG. 1 includes other components. For example, the system shown in FIG. 1 includes a server (120). The server (120) is one or more server computers, possibly in a distributed computing environment, which may be implemented using the one or more embodiments described with respect to FIG. 6A and/or FIG. 6B.

The server (120) includes a computer processor (122). In one or more embodiments, the computer processor is a hardware processor or a logical processor supported by a hardware process. While the computer processor (122) is referred-to in the singular sense, the term "computer processor (122)" automatically contemplates one or more computer processors operating in tandem, in a possibly distributed computing environment.

The server (120) uses the computer processor (122) to execute or support a platform (124). The platform (124) is one or more software and/or hardware components that, operating together, support activation of the conference session (126) or the multiple conference sessions (128), and also support the scheduling application (130), the messaging application (132), and the question generation application (134). In one or more embodiments, the platform (124) may be implemented on a distributed computing system.

The platform (124) is independent of the first user device (136) and the second user device (144). In other words, the platform (124) is executed as a distinct logical software application, and usually is executed on a distinct separate computing system, relative to the first user device (136) and the second user device (144).

The server (120) uses the computer processor (122) to execute a conference session (126). The conference session (126) is an instance of a video or audio conference established between a first user device (136) (e.g., a customer) and a second user device (144) (e.g., a business). The conference session (126) may be imitated as an audio session and then switch or transition to a video session (or vice-versa). The conference session (126) is supported by the execution, by the computer processor (122), of computer readable program code (102) on the data repository (100).

The conference session (126) may include additional parties, and is not limited to being between just the first user device (136) and the second user device (144). Additionally, in one or more embodiments, the multiple conference sessions (128) may be executing on the server (120) concurrently. Different ones of the multiple conference sessions (128) are kept securely separate from each other. Thus, users of different ones of the multiple uniform resource indicators (106) do not interfere with each other. Moreover, different users that activate the same uniform resource indicator (104) concurrently do not accidentally or deliberately join an ongoing conference session (126).

The server (120) uses the computer processor (122) to execute a scheduling application (130). The scheduling application (130) is software and/or application specific hardware, expressed as part of the computer readable program code (102). The scheduling application (130) is executable by the computer processor (122) to schedule the conference session (126) or the multiple conference sessions (128) when one of the first user device (136) and the second user device (144) is not available for immediate connection to a conference session (126).

The server (120) uses the computer processor (122) to execute a messaging application (132). The messaging application (132) is executable to transmit, electronically, the message (108) and/or the multiple messages (110) to the second user device (144). The messaging application (132) may also be used, in some cases, to transmit other types of messages or electronic communications among the platform (124), the first user device (136), the second user device (144), and/or a third party website (152), described below. Thus, for example, the messaging application (132) may be used to transmit, to the second user device (144), a video message or audio message recorded by the first user device (136).

The server (120) uses the computer processor (122) to execute a question generation application (134). The question generation application (134) is an application that transmits, to the first user device (136), questions generated by the second user device (144). The question generation application (134) may be used in conjunction with the scheduling application (130) to facilitate scheduling a conference session (126) in the future.

The system shown in FIG. 1 includes other components. For example, the system shown in FIG. 1 includes a first user device (136). The first user device (136) is a computing device (e.g., mobile phone, tablet, laptop, desktop, etc.) operated by a user that activates the uniform resource indicator (104). The first user device (136) also may interpreted as a first Web browser which presents the conference session (126) on the first user device (136).

The one or more embodiments contemplate that, in many cases, the first user device (136) does not own the uniform resource indicator (104), but rather accesses the uniform resource indicator (104) via a publicly available source on the Internet. However, the one or more embodiments contemplate that the owner of the uniform resource indicator (104) could still use the uniform resource indicator (104) to establish a conference session (126). Thus, the term "first user device (136)" only refers to the computing device that initiates the conference session (126) by activation of the uniform resource indicator (104).

The first user device (136) includes components useable to facilitate the conference session (126). Thus, for example, the first user device (136) includes a display 1 (138) for displaying the conference session (126) and various other information described herein. The first user device (136) also may include a camera 1 (140) for recording still picture or video images for use in the conference session (126). The first user device (136) also may include a microphone 1 (142) for recording audio received at the first user device (136). In one or more embodiments, the camera 1 (140) and the microphone 1 (142) are optional, as additional user devices may be used to provide the video and/or audio input. For example, a telephone connection could provide the audio input, and a remote camera could provide the video input; alternatively, only audio input or only video input may be activated for a given conference session (126).

The system shown in FIG. 1 also includes a second user device (144). The second user device (144) is a computing device (e.g., mobile phone, tablet, laptop, desktop, etc.) operated by a user that owns the uniform resource indicator (104). The second user device (144) also may be interpreted as a second Web browser which presents the conference session (126) on the second user device (144).

The uniform resource indicator (104) is uniquely assigned to the user of the second user device (144). The user may operate many computing devices; however, the "second user device (144)" is the current user device being used by the user that owns the URI, or that has been granted permission by the URI owner to receive requests for conference sessions via activations of the uniform resource indicator (104).

The second user device (144) also includes components useable to facilitate the conference session (126). Thus, for example, the second user device (144) includes a display 2 (146) for displaying the conference session (126) and various other information described herein. The second user device (144) also may include a camera 2 (148) for recording still picture or video images for use in the conference session (126). The second user device (144) also may include a microphone 2 (150) for recording audio received at the second user device (144). In one or more embodiments, camera 2 (148) and the microphone 2 (150) are optional, as additional user devices may be used to provide the video and/or audio input. For example, a telephone connection could provide the audio input, and a remote camera could provide the video input; alternatively, only audio input or only video input may be activated for a given conference session (126).

The first user device (136) may be video incompatible with the second user device (144). The term "video incompatible" means that the first user device (136) and the second user device (144) cannot establish an instant, direct video conference with each other. In a specific example, a mobile phone operating the ANDROID® operating system is not capable of establishing an instant, direct conference with another mobile phone operating the IOS® operating system. Rather, the two mobile phones would ordinarily have to pre-schedule a video conference on an independent platform, or may use the platform (124) according to the one or more embodiments.

The system shown in FIG. 1 also includes, or communicates with, a third party website (152). The third party website (152) is a website that provides some other service useable with respect to the conference session (126) and/or the platform (124).

In many cases, the third party website (152) only contains a URI posting (154). The URI posting (154) is a display or a link to the uniform resource indicator (104). Thus, for example the third party website (152) may be a list of authorized vendors, of which one or more of the vendors has a uniform resource indicator (104) displayed for use. Thus, when a customer (i.e., the first user device (136)) views the URI posting (154) on the third party website (152), the user may select the uniform resource indicator (104) to start an instant conference session (126) with the second user device (144).

However, the third party website (152) may perform other functions, as well. For example, the third party website (152) may provide additional information for use by the platform (124) in establishing the conference session (126) or providing services during the conference session (126). For example, the third party website (152) may be a financial management application that records transactions that occur during the conference session (126). In another example, the third party website (152) may be an online payment system that allows the exchange of funds between the first user device (136), the second user device (144), and/or the platform (124). The one or more embodiments contemplate that the third party website (152) may be multiple websites providing a variety of different functions.

While FIG. 1 shows a configuration of components, other configurations may be used without departing from the scope of the one or more embodiments. For example, various components may be combined to create a single component. As another example, the functionality performed by a single component may be performed by two or more components.

Figure 2:
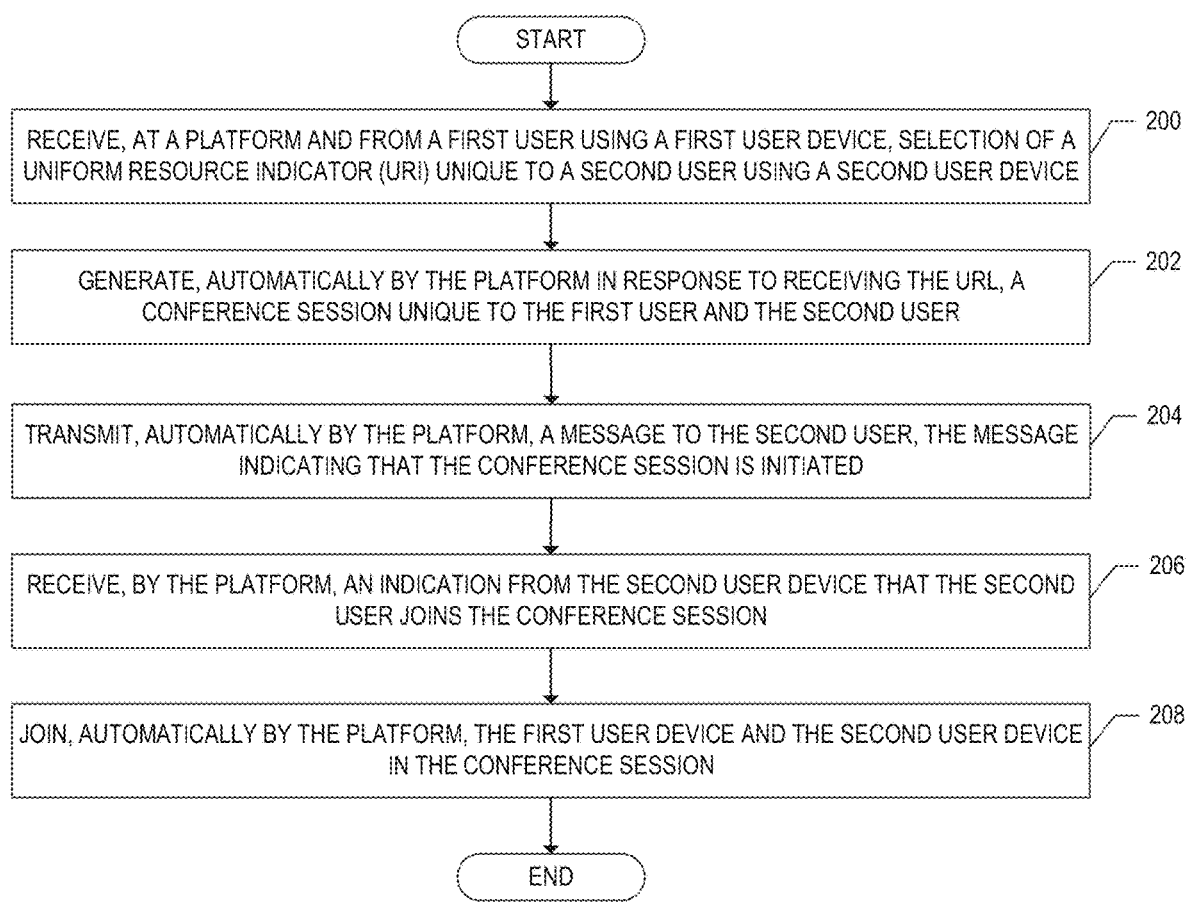
FIG. 2 and FIG. 3 show flow charts depicting methods of instant conferencing in accordance with one or more embodiments.
Figure 3:
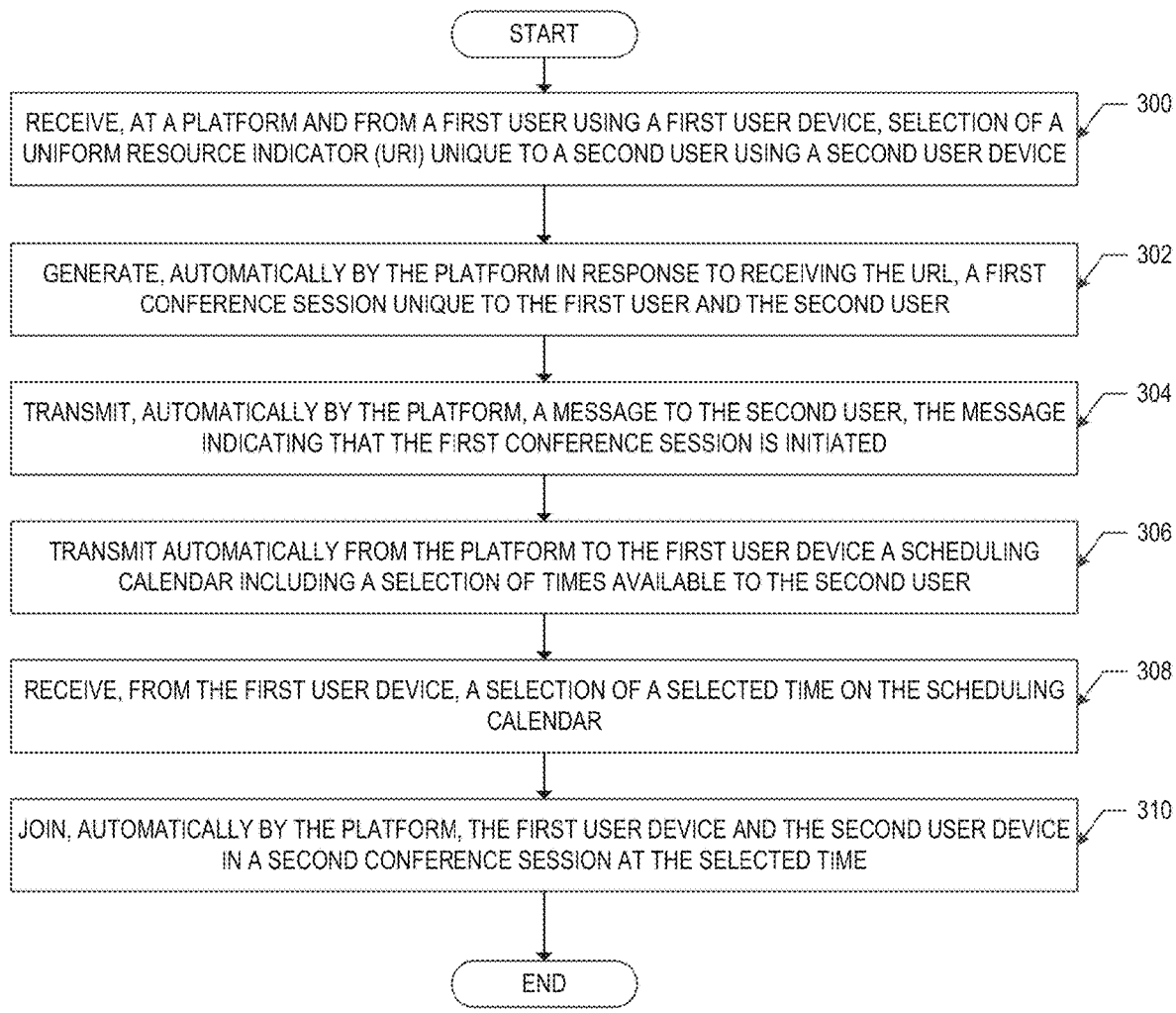

FIG. 2 and FIG. 3 are flowcharts, in accordance with one or more embodiments. The methods shown in FIG. 2 and FIG. 3 may be implemented using the system shown in FIG. 1, possibly supported by the computing system and network environment shown with respect to FIG. 6A and FIG. 6B.

Attention is now turned to FIG. 2. Step 200 includes receiving, at a platform and from a first user using a first user device, selection of a uniform resource indicator (URI) unique to a second user using a second user device. Receiving may be performed over a network at the server responsible for executing the platform. The first user device that selects the URI is operated by a user that is different than either the second user device that owns the URI, or the server that executes the platform. The URI is unique to the second user device, even if the second user device has additional URIs for use with the platform.

An example of selecting the URI could be the first user device executing a Web browser to visit a website in which the URI is advertised. The first user uses the first user device to select (e.g., click on) the URI, which then initiates the remaining steps of the method of FIG. 2 on the platform.

Step 202 includes generating, automatically by the platform in response to receiving the URI, a conference session unique to the first user and the second user. Generating is performed by the platform, which uses the URI to establish a conference session between at least the second user device (the owner of the URI) and the first user device (operated by the first user that selected the indicator). Information in the URI establishes the identity of the second user device, and information transmitted by the first user device upon selection of the URI identifies the first user device.

Thus, responsive to receiving an indication of selection of the URI, the platform executes pre-loaded code. The pre-loaded code is executable to generate the video conferencing session. The conference session is thus ready for use immediately by both the first user device and the second user device.

The generating operation at step 202 may also include generating, automatically by the platform, a globally unique identifier (GUID) associated with the conference session. In this case, generating the conference session includes allowing only the first user device and the second user device to join the conference session associated with the GUID. In this manner, security may be improved, and if some other, different user selects the URI (e.g., from a different website being displayed on a different computer to a different user), the other user will not be added to the current conferencing session. Rather, the other user will be joined to a new conferencing session unique to the other user and the second user (the owner of the URI).

Step 204 includes transmitting, automatically by the platform, a message to the second user, the message indicating that the conference session has been initiated. The platform sends a message via the network to the second user device (the owner of the URI). The message notifies the second user device that someone, perhaps unknown to the user of the second user device, has initiated the conference session. The message may take the form of an email, file transfer, instant message, etc.

Step 206 includes receiving, by the platform, an indication from the second user device that the second user has joined the conference session. As indicated at step 204, the second user device (the URI owner) received a message and a prompt that a new conference has been initiated by party currently unknown by the second user (i.e., the first user device). In response, the second user device returns another communication (the indication) to the platform indicating that the second user device has joined the conference session. For example, the second user of the second user device may select a link, button, etc. that causes the camera and microphone (or alternative video and audio inputs) of the second user device to transmit video and audio to the platform for the conference session.

Step 208 includes joining, automatically by the platform, the first user device and the second user device in the conference session. Either before or after the second user device has joined the conference session, the first user device is joined to the conference session. The camera and microphone of the first user device (or alternative video and audio inputs) of the first device transmit video and audio to the platform for the conferencing system. Thus, the first user (the person who selected the URI) and the second user (the owner of the URI) are now joined in a conference.

The method of FIG. 2 is an instant conferencing method. The method of FIG. 2 is instant because no scheduling of the conference took place. Rather, the process of starting the conference session was entirely automatic, responsive to the first user device transmitting the selection of the URI.

Furthermore, the conference session is platform independent, relative to the first user device and the second user device. Thus, for example, the first user device and the second user device may be otherwise incompatible with each other. However, because the platform mediates the conference session, both user devices can still display the conference session.

Thus, the method of FIG. 2 presents a technical solution to the technical problem of establishing an instant, platform-independent conferencing system. However, the method of FIG. 2 may be extended or varied.

For example, in one or more embodiments, prior to joining the first user device and the second user device in the conference session and after receiving the indication, a prompt may be transmitted to the first user device. The prompt requests the first user to confirm that the first user will join the conference session. The prompt serves as a warning to a first user of the first user device that they are about to be added to a conferencing session. The prompt may also allow the user to disable video, audio, or both, temporarily. Thus, for example, the instant conferencing session could be expressed as an instant chat session, rather than as a conference. In any case, the joining at step 208 may be characterized in some embodiments as joining the first user device and the second user device in the conference session after receiving an affirmative response to the prompt.

As indicated above, the method of FIG. 2 may be further extended with respect to additional users who select the URI using additional remote user devices. Thus, for example, the method of FIG. 2 may also include receiving, at the platform from a third user operating a third user device, a second selection of the URI. Receiving is performed in a manner similar to that described at step 200, but now the message is from a different user device.

In the variation, the method also includes generating a globally unique identifier (GUID) associated with receipt of the second selection of the URI. The GUID is generated by randomly, or perhaps sequentially, generating a string of alphanumeric characters that is unique to the selection instance.

In the variation, the method also includes generating a second conference session associated with the GUID. Generation of the second conference session is similar to step 202 of FIG. 2, however, the second conference session is different than the prior conferencing system and only will include the additional user device and the second user device.

In the variation, the method also includes transmitting, automatically by the platform, a second message to the second user, the message indicating that the second conference session has been initiated. Transmitting is similar to step 204, but with respect to the other user device.

In the variation, the method also includes receiving, by the platform, a second indication from the second user device that the second user has joined the second conference session. Receiving the second indication is similar to receiving the indication at step 206. However, the term "second indication" is used to distinguish the indication sent with respect to the first and second conference sessions.

In the variation, the method also includes joining, automatically by the platform, the third user device and the second user device in the second conference session. Joining is similar to step 208, but again a new, different conferencing session is established that is distinct from the other conference that was established.

Thus, the conference session at step 208 may be characterized as a first conference session. In the variation, the method also includes only including the second user device and the third user device in the second conference session. In the variation, the method also includes only including the second user device and the first user device in the first conference session.

The method of FIG. 2 may be further varied. For example, the method of FIG. 2 may also include, prior to generating the conference session, transmitting to the first user device a question as a prompt. In this case, responsive to receiving an answer to the prompt, generation of the conference session is modified based on the prompt.

For example, the prompt may be a series of questions that the second user (e.g. the business) commonly asks of potential clients (e.g., the customer). The prompt may be a prompt that displays when the second user (e.g. the owner of the URI) will be available for a conference. Based on the answers, the generation of the conference session can be modified, such as by accelerating generation of the conference session, delaying generation of the conference session, or routing the conference session to a different user device operated by a different user authorized by the second user device to handle the particular first user. For example, a doctor may, based on the questions in the prompt, route the conferencing session to a different user device operated by a nurse or a physician's assistant.

Still other variations are possible. For example, the method of FIG. 2 may be extended to include adding a tool to the conferencing session. For example, the tool may be a second URI to conduct electronic commerce with the second user, a link to begin an augmented reality session, a link to leave a video message, a link to leave an audio message, a link to record the session, a link to a scheduling calendar, a link to add an additional user device to the conferencing session, and combinations thereof. Other tools are possible. In any case, the tool provides additional functionality useable by one or both of the first user device (e.g. the customer) and the second user device (e.g. the business that owns the URI).

Attention is now turned to FIG. 3. The method of FIG. 3 is a variation of the method of FIG. 2. The method of FIG. 3 may be performed using the system of FIG. 1, possibly supported by the computing device(s) and network environment described with respect to FIG. 6A and FIG. 6B.

Step 300 includes receiving, at a platform and from a first user using a first user device, selection of a uniform resource indicator (URI) unique to a second user using a second user device. The selection is received because selecting or activating the URI directs a command to be sent to the platform. The command triggers the platform to initiate the remaining steps in FIG. 3. In an example, a customer may select a URI on a website in order to try to establish a conference with a business.

Step 302 includes generating, automatically by the platform in response to receiving the URI, a first conference session unique to the first user and the second user. Step 302 is similar to step 202 of FIG. 2. In addition, a pre-recorded video message may be displayed to the first user device as part of generating the first conference session.

Thus, for example, while a customer who selected the URI is waiting for the business representative to join the conference, the customer can view a video message from the business representative from within the conferencing system. The video message may also be an audio or written message, or a combination thereof, and need not be a video message. The video recording may be displayed at a later time to the second user device, such as after the conference session, or at a time of choosing by one or both of the first user and the second user.

Step 304 includes transmitting, automatically by the platform, a message to the second user, the message indicating that the first conference session has been initiated. Step 304 is similar to step 204 of FIG. 2.

Step 306 includes, responsive to receiving an event from the second user, transmitting automatically from the platform to the first user device a scheduling calendar including a selection of times available to the second user. In the method of FIG. 3, the conference is not established immediately upon receipt at the platform of the selection of the indicator. Instead, in response to the event, a scheduling application sends a scheduling calendar showing days and/or times which the second user of the second user device (e.g., the business) will be available for a conference. The event may be the second user failing to respond to the message, the second user indicating to the platform that the second user is busy, or some other contingent event.

As an example, step 306 may include transmitting a question as a prompt to the first user device. In this case, the platform presents, to the second user device, an answer to the prompt. For example, the question may be a technical question by a customer (i.e., the first user device) and the answer may be an answer by the business (i.e., the second user device), with the platform delivering the answer. The platform could also deliver an automatic response to certain questions, on behalf of the second user device.

Step 308 includes receiving, from the first user device, a selection of a selected time on the scheduling calendar. The user of the first user device (e.g., the customer) sends the selection of the selected time by way of a pop-up window, cookie, etc. The platform receives the selected time.

Step 310 includes joining, automatically by the platform, the first user device and the second user device in a second conference session at the selected time. The conference session is established as in step 208 of FIG. 2, but at the scheduled time. Thus, the one or more embodiments are capable of performing pre-scheduled conferencing using the URI, as well as instant conferencing.

The method of FIG. 3 may be varied. For example, the method of FIG. 3 may be performed in relation to the method of FIG. 2. When the method of FIG. 2 results in a "first" conference, the method of FIG. 3 may include, responsive to receiving the event, terminating the first conference session. In this case, the method of FIG. 3 also includes initiating, automatically at the selected time, the second conferencing session. The second conferencing session may be a continuation of the first conferencing session.

While the various steps in the flowcharts of FIG. 2 and FIG. 3 are presented and described sequentially, one of ordinary skill will appreciate that some or all of the steps may be executed in different orders, may be combined or omitted, and some or all of the steps may be executed in parallel. For example, the order of joining calls to the conferencing session may be varied. Specifically, in some embodiments, the owner of the URI may join the conferencing session before the user who selects the URI. The owner of the URI may not have scheduled the conference, but is merely immediately available for the teleconference session whenever another user selects the URI. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 4 through FIG. 10 present a specific example of the techniques described above with respect to FIG. 1 through FIG. 3. The following example is for explanatory purposes only and not intended to limit the scope of the one or more embodiments. Many other variations are possible.

Figure 4:
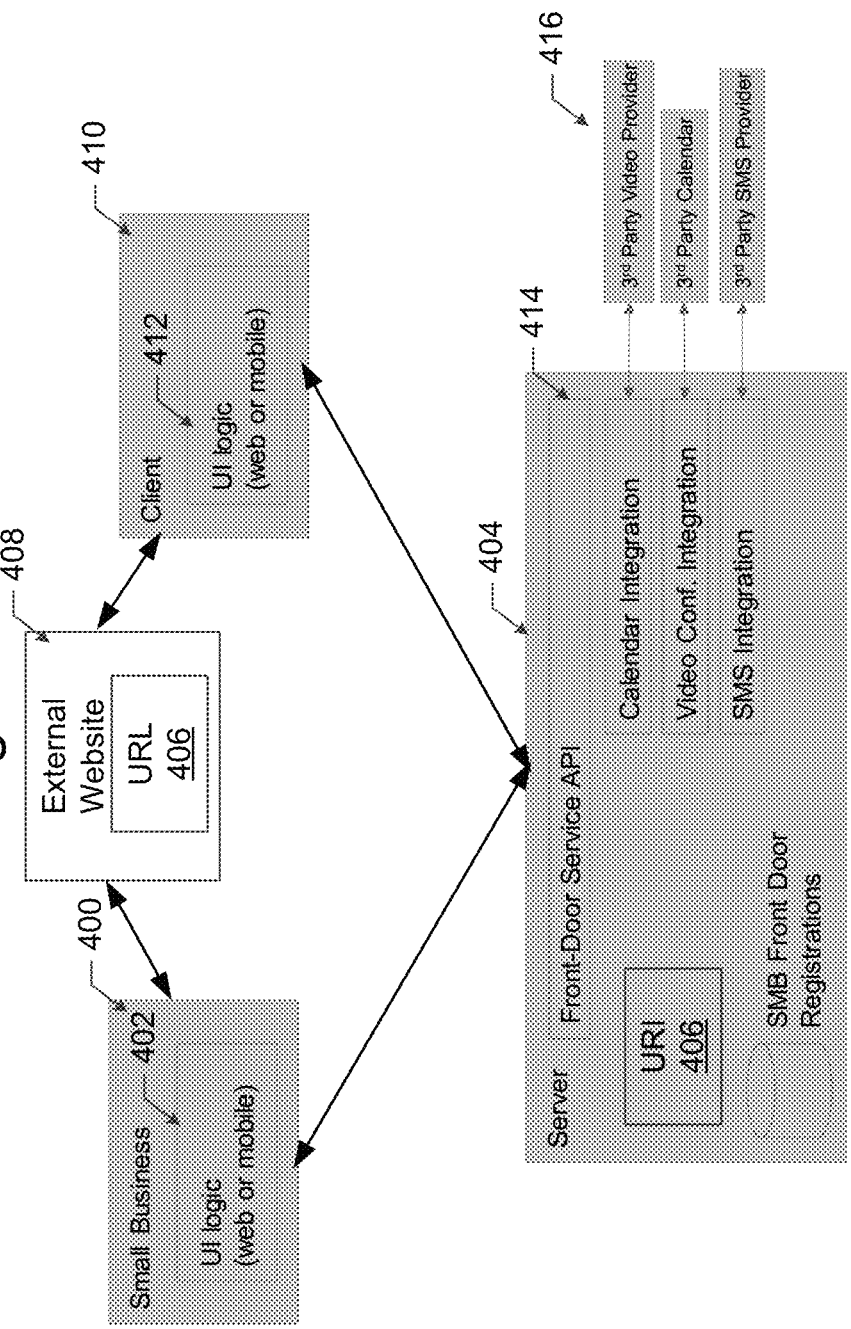
FIG. 4 shows an exemplary architecture for an instant conferencing system in accordance with one or more embodiments.

Attention is first turned to FIG. 4, which shows a diagram of an architecture for an instant video conferencing system according to the one or more embodiments. In this example, the video conferencing system is referred-to as a "virtual front door," as by analogy the one or more embodiments are an online, virtual representation of a customer walking into the front door of a business.

A small business (400) operates a second user device, including user interface logic (UI logic (402)) from a web-capable or mobile device. The small business (400) registers a virtual front door for their business with a server (404). Registering the virtual front door takes the form of obtaining a URI (406), which may be selected by the small business (400) or possibly assigned by the server (404). The server (404), in this example, may be the platform described with respect to FIG. 1 through FIG. 3.

The small business (400) then publishes the URI (406) on an external website (408) (e.g. a trade website, the business's website, YELP®, etc.). In this manner, the public, or at least a target audience, is made aware that the small business (400) is willing to engage in instant video conferencing.

Thereafter, a client (410) discovers the URI (406) on the external website (408). The client clicks on or otherwise selects the URI (406) on the external website (408) using UI logic (412). Selection of the URI (406) causes a short message service (SMS) message to be sent to a front-door service API (414) on the server (404). The API is defined as a computer program that acts as an intermediary between different computer programs.

In response, the server (404) sends another SMS message to the small business (400) to notify the small business (400) that the client (410) desires to engage in an impromptu video conference. If the small business (400) responds within a predetermined time (e.g., a minute or two), then logic in the server (404) will detect the entry of the small business (400) into the video conference and alert the client (410) that the small business (400) has joined and is able to meet now in the video conference.

Otherwise, a calendar scheduling UI at the server (404) is generated and transmitted to the client (410). The client (410) can then use the calendar scheduling UI to schedule a unique meeting at a later time.

In the one or more embodiments, the server (404) need not directly provide the video conferencing, calendar, or SMS services. Instead, the server (404) acts as a intermediator platform between the small business (400), the client (410), and third party providers (416). In this case, the server (404) uses integration logic to communicate with the third party providers (416). The integration logic may take the form of additional APIs.

Attention is now turned to FIG. 5A through FIG. 5J. FIG. 5A through FIG. 5J show example screenshots that demonstrate examples of what users might see when using the platform shown in FIG. 1 and the platform performs the methods of FIG. 2 and/or of FIG. 3. FIG. 5A through FIG. 5J should be viewed together. The example of FIG. 5A through FIG. 5J assume that the business is an expert, such as a tax expert (504) in FIG. 5A, who provides professional tax advice for clients. The tax expert (504) in FIG. 5A operates a business entitled "Wisely Finance."

Figure 5A:
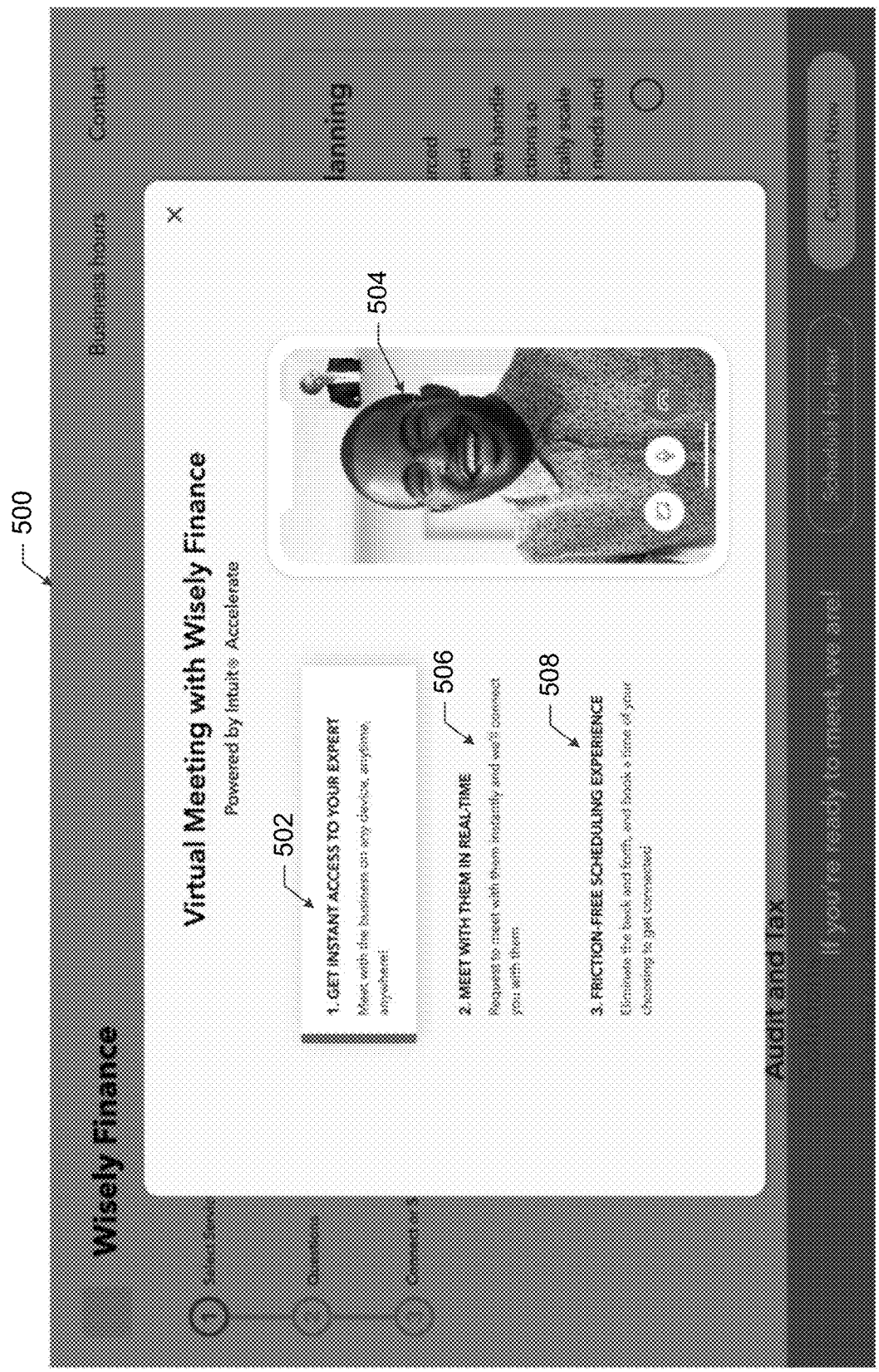

Screenshot (500) in FIG. 5A shows a screenshot presented to a client. The client is given the opportunity to initiate a virtual meeting with an expert. In this example, the URI is hidden in the form of a selectable screen segment (502). An image of the tax expert (504) is provided for advertising purposes and to clearly show that what is proposed is a video conference session on a mobile device. Additional options and descriptions may be provided, as shown at area (506) and area (508).

Figure 5B:
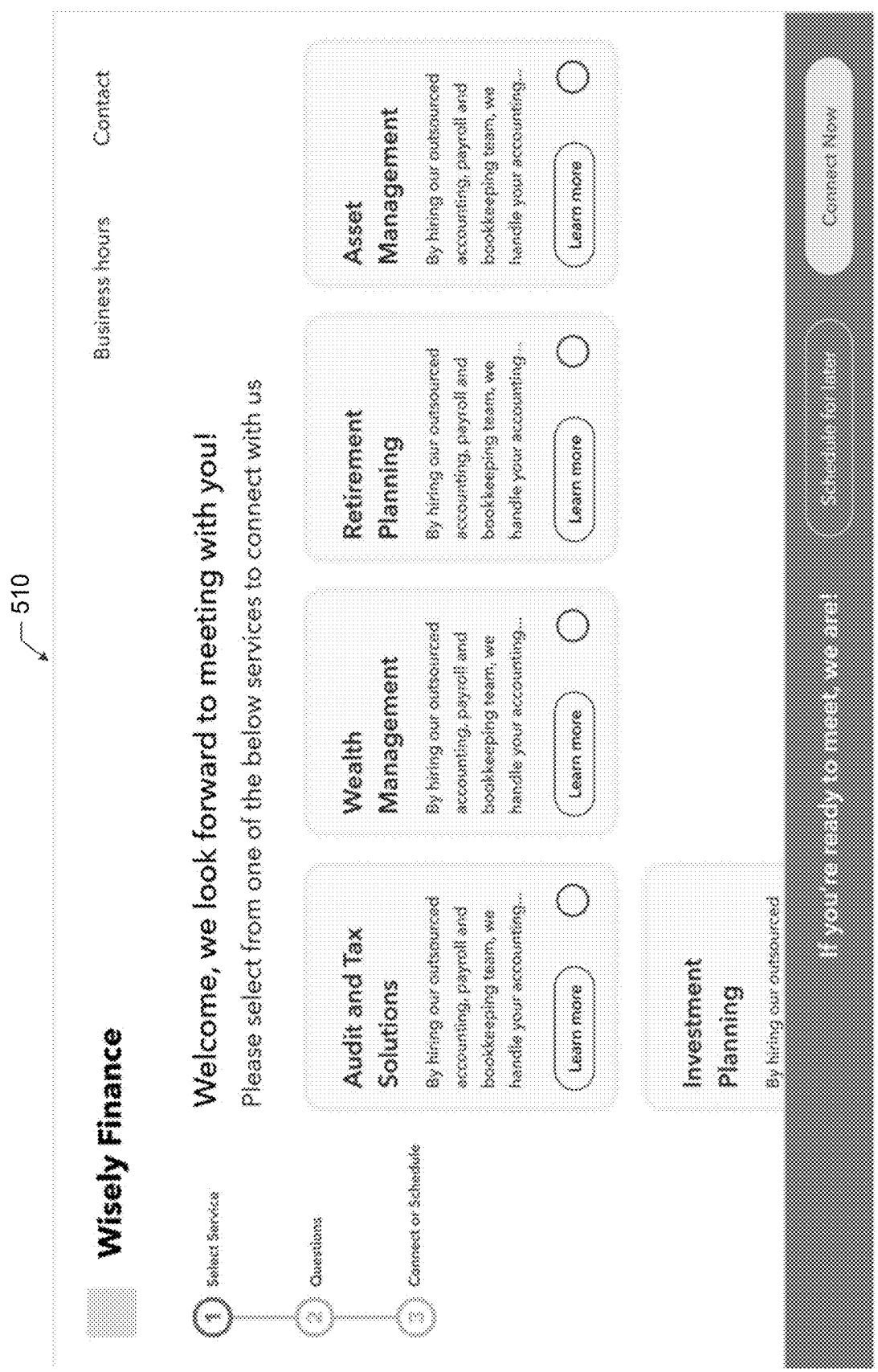

Screenshot (510) in FIG. 5B shows a message presented to the client after the client has selected the URI via activation of the selectable screen segment (502) in FIG. 5A. The client is greeted by a prompt which shows a list of options in which the client might be interested. The client's selection can change how the video conference is routed at the business. Screenshot (512) in FIG. 5C shows that the user has selected "audit and tax solutions" (514) by selecting the check box (516).

Figure 5C:
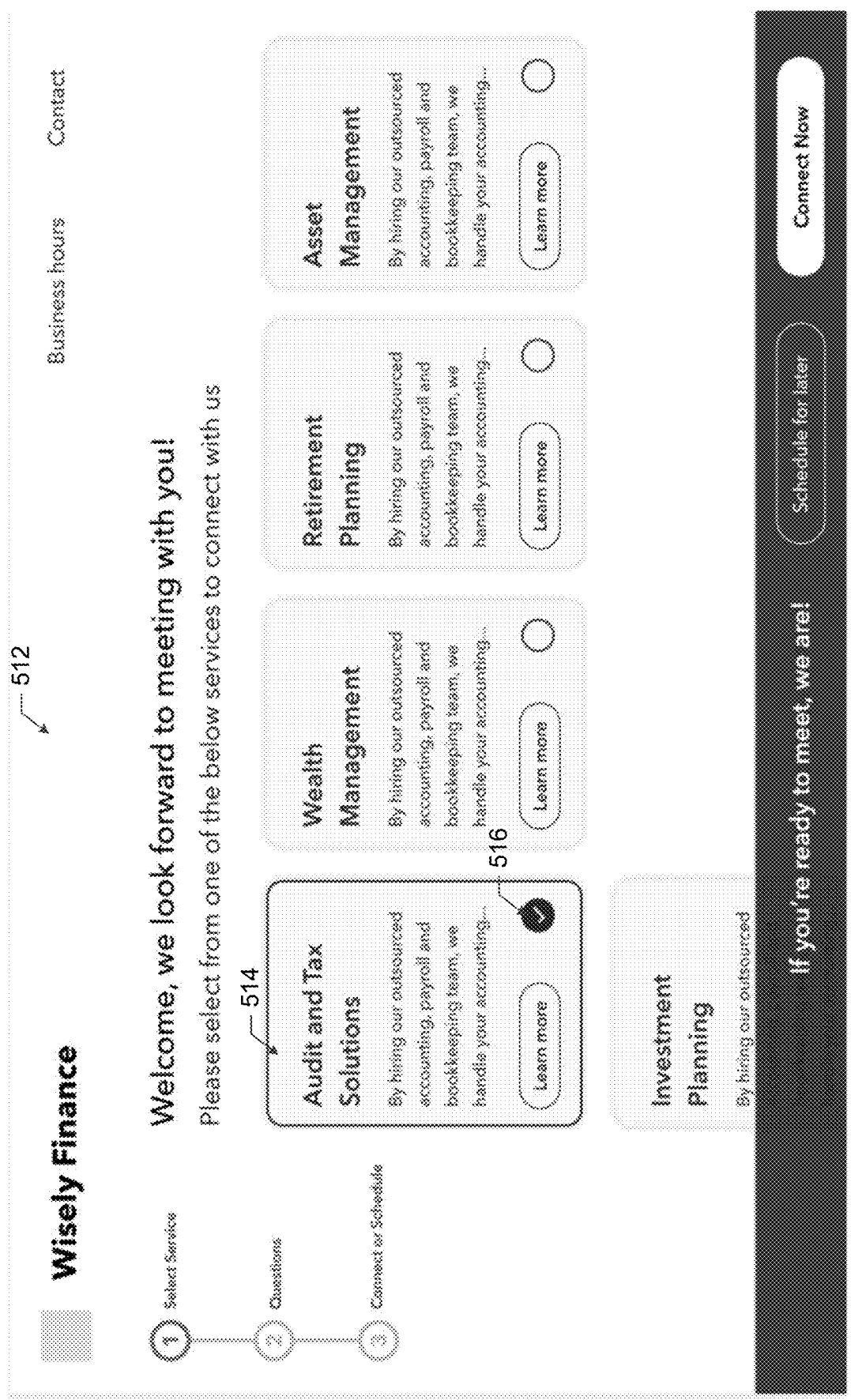

Screenshot (518) in FIG. 5D provides an additional prompt shown to the client, after the client selected the "audit and tax solutions" (514) service shown in FIG. 5C. The client is prompted to provide personal information relating to the kind of service in which the client is interested.

Figure 5E:

Screenshot (520) in FIG. 5E informs the client that the connection is pending. The client is advised as to an average wait time, two minutes in this example. The wait time may be a pre-determined amount of time, at the expiration of which an automatic scheduling program will be presented to the user. The wait time may reflect the average pendency of time before the expert will become available for the video conference. The user is also given an opportunity to schedule the video conference for a later time via widget (522), such as when the user can not wait for the estimated time. Alternatively, the user may go back to the prior screen, using widget (524), to request a different service type. As used herein, a "widget" is a button, scroll bar, wheel, drop-down menu, etc. which a user can manipulate on a user interface to interact with the program.

Figure 5F:
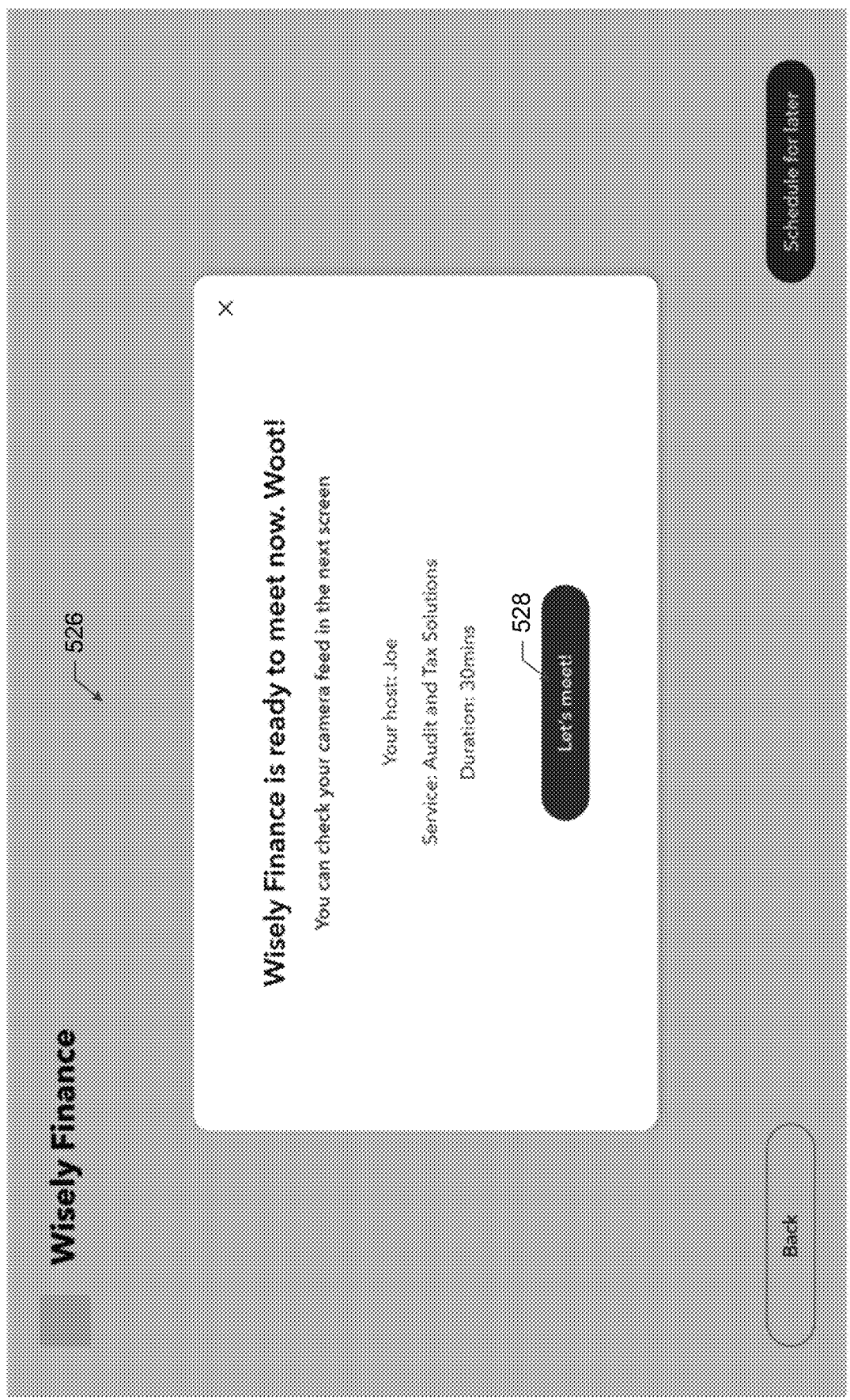

Screenshot (526) in FIG. 5F shows to the client that the tax expert is available to join the video conference. The client is given the opportunity to confirm the activation of the video conference via widget (528). Additional information also may be presented, such as the name of the tax expert, the service provided, and the scheduled duration of the video conference.

Figure 5G:
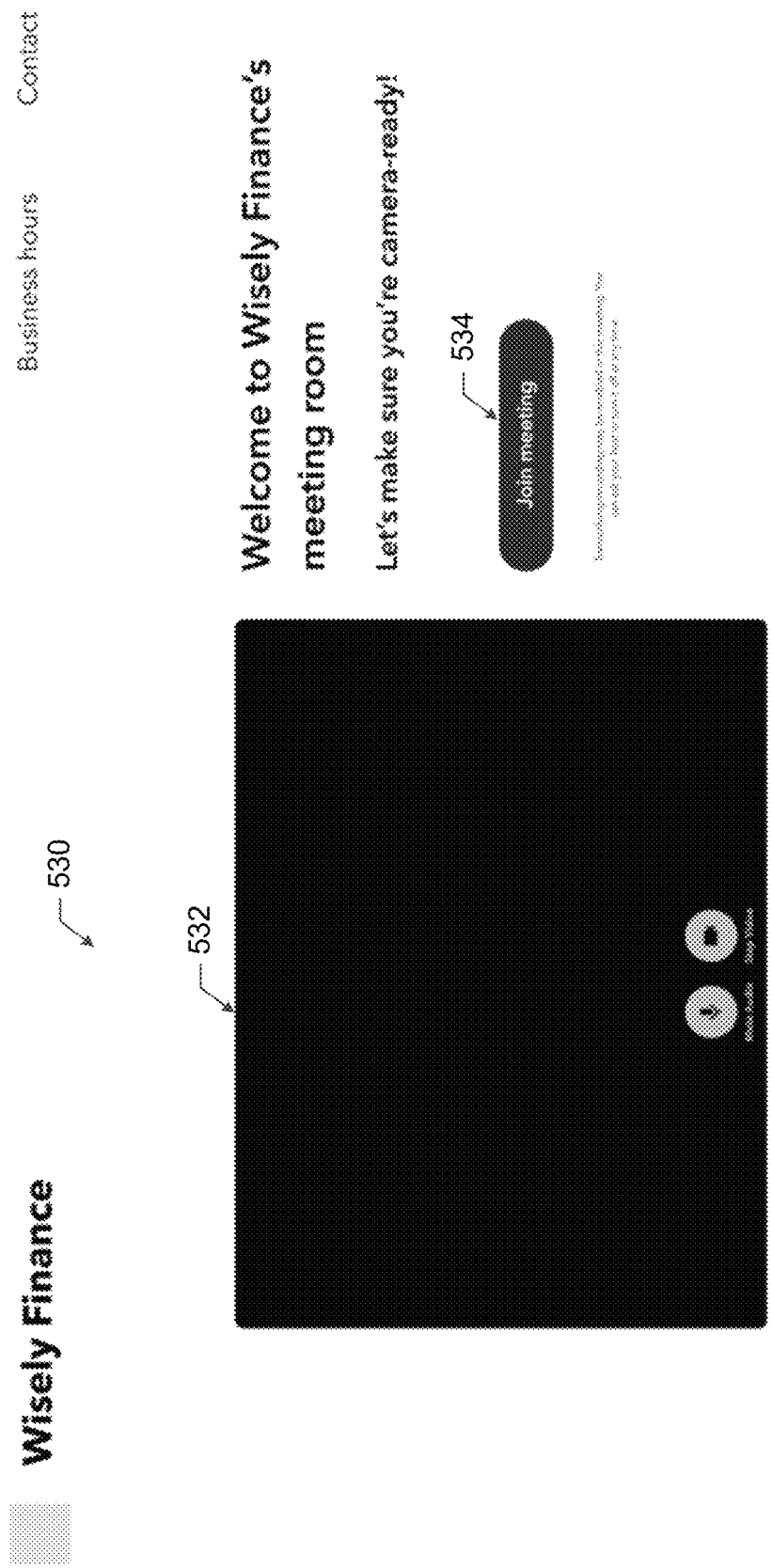

Screenshot (530) in FIG. 5G shows the video conference in a display window (532). The client may be prompted to join the meeting again via widget (534).

Figure 5H:

Screenshot (536) in FIG. 5H shows an example screenshot of a scheduling calendar presented to the client. For example, the tax expert might not be immediately available, the client might decide not to wait for the expected wait time, or the question asked might require a scheduled time. In any case, the scheduling application sends the UI shown screenshot (536). The user, in this example, selects Monday, February 8 at 3:30 p.m. as a future time to schedule the video conference, and then selects the "continue" widget (538) to continue with the process.

Figure 5I:
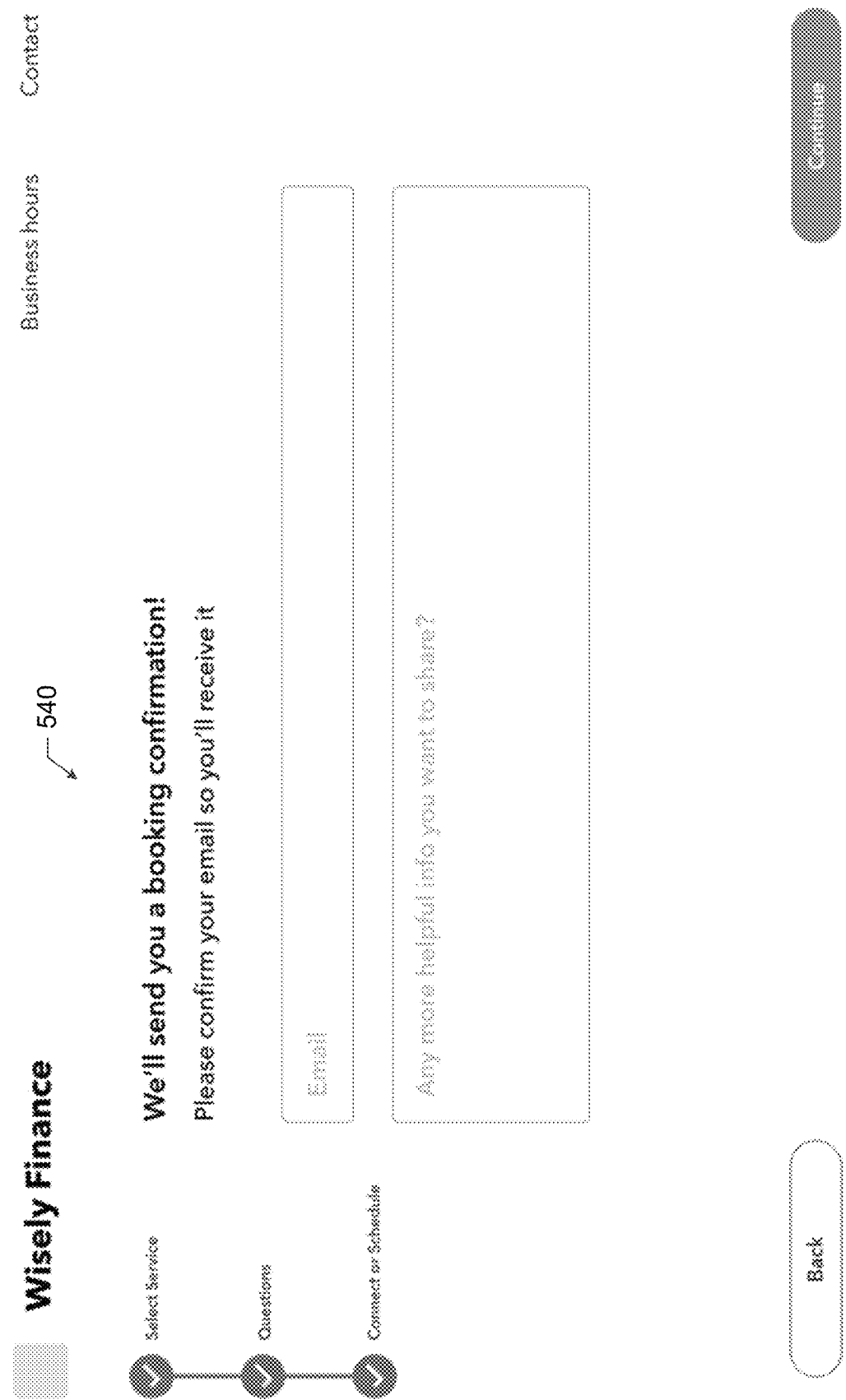
Figure 5J:
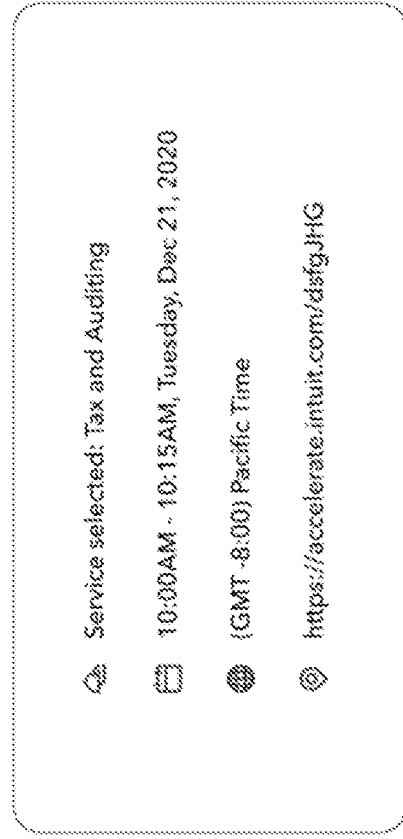

Screenshot (540) in FIG. 5I shows another UI that prompts the user to provide an email address and any other pertinent information. In this manner, the user can be sent a confirmation of the scheduled time for the video conference. Screenshot (542) in FIG. 5J shows the confirmation screen presented to the user after the client has entered the information prompted in FIG. 5I. The time of the video conference is shown, the nature of the meeting is shown, and an indicator is provided so that the user can more quickly start the video conference at the scheduled time.

A summary of the one or more embodiments is now presented in the form of another example. Again, the following example does not necessarily limit the other one or more embodiments described above or the one or more embodiments claimed.

First, a business uses a business name name and location information to create a universal "handle" or virtual front foor. The handle or virtual front door is expressed in the form of a URI. The URI contains a unique string associated with the business. For example, ABC Legal may have a URI in the form of: https://abcd.com/b/abclegal.

There are a variety of techniques that may be used to formulate the globally unique string. The string may include separating human-readable words with periods, dashes, or other characters. The purpose of the URI is to create a human-readable and communicable link. Thus, in an embodiment, no codes or difficult-to-parse codes are used. The location may be included in the URI if the location is relevant and helpful for the nature of the business.

Once the URI is established, the business may add the URI to their presence on a website owned by the business, on YELP®, GOOGLE®, YP.COM®, in advertisements, journals, websites, magazine articles, newsprint, etc. Alongside possibly other information, such as phone numbers and emails, the URI may be instantly recognized by the customer as an effective way to engage with the business.

Once a customer enters the URI or clicks the link in a web browser, the customer is taken to the "commerce page" for the business. The commerce page is a website that be used to begin contact, collaboration, and ultimately commerce with the business.

At first, video chat will be the preferred form of communication because of the benefits for expert-led business engagements. Businesses are instantly able to see any artifacts related to the work. The artifacts may include appliances or machinery, landscapes, indoors office or home spaces, etc. Additionally, tools may be provided over video in the video conference UI to augment and create an experience that may be better than meeting in person.

For example, augmented reality features, measuring tools, recording tools, payment tools, etc. may be provided. The first video contact may produce digital artifacts (screenshots, recordings, etc.) that may begin the collaboration. Additionally, the customer or business may upload additional material.

After the initial contact, video conversations and collaboration space, the URI may also provide both parties with the means to conduct commerce. Thus, for example, the platform may facilitate posting an estimate, reporting on progress, posting an invoice, providing a payment, etc.

Information or documents that are posted may be stored on a mutual journal and may provide a strict ordering. The one or more embodiments may have specific formats or standards for common documents such as estimates, invoices, payments, receipts, etc. Thus, the one or more embodiments may also be able to tally information and display a balance or show time-progression of the exchange. The one or more embodiments may also show a recording of a conversation or video conference system. Other variations are possible.

Figure 6A:
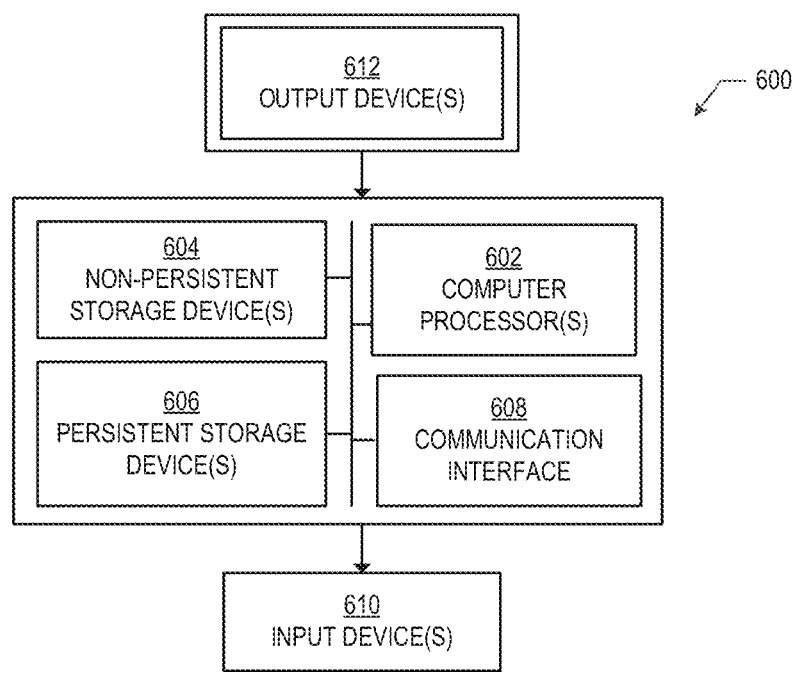
FIG. 6A and FIG. 6B show an example of a computing system and network environment in accordance with one or more embodiments.
Figure 6B:
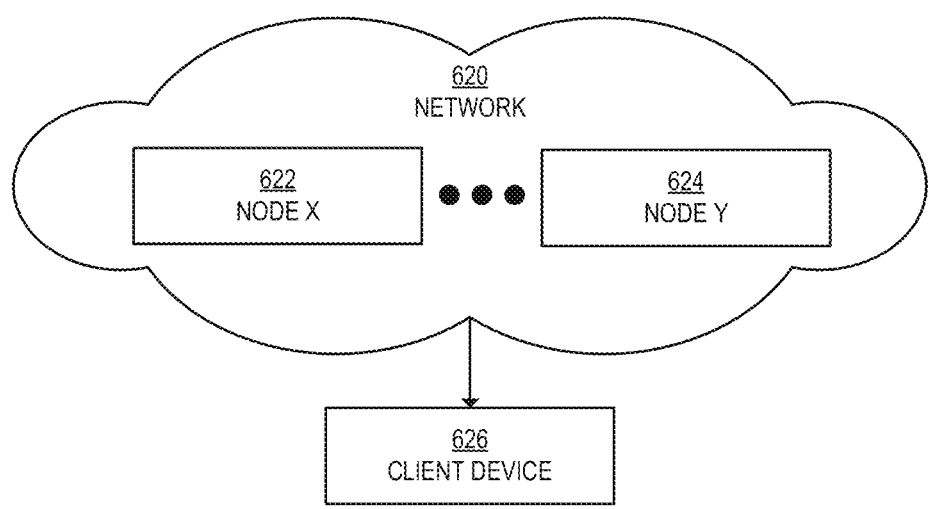

FIG. 6A and FIG. 6B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage device(s) (604) (e.g., volatile memory, such as random access memory (RAM), cache memory), persistent storage device(s) (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (608) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (612), such as a screen (e.g., a liquid crystal display (LCD), a plasma display, a touchscreen, a cathode ray tube (CRT) monitor, a projector, or other display device), a printer, an external storage, or any other output device. One or more of the output device(s) (612) may be the same or different from the input device(s) (610). The input and output device(s) (610 and 612) may be locally or remotely connected to the computer processor(s) (602), the non-persistent storage device(s) (604), and the persistent storage device(s) (606). Many different types of computing systems exist, and the aforementioned input and output device(s) (610 and 612) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of the one or more embodiments.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a URI within a web client of the user device, thereby initiating a Hypertext Transfer Protocol (HTTP) or other protocol request being sent to the network host associated with the URI. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URI may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (600) of FIG. 6A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
   receiving, at a platform and from a first user using a first user device, selection of a uniform resource indicator (URI) unique to a second user using a second user device;
   generating, automatically by the platform in response to receiving the URI, a conference session unique to the first user and the second user;
   transmitting, automatically by the platform, a message to the second user, the message indicating that the conference session is initiated;
   receiving, by the platform, an indication from the second user device that the second user joins the conference session;
   transmitting, after receiving the indication from the second user device, a prompt to the first user device, wherein the prompt requests the first user to confirm that the first user joins the conference session; and
   joining, automatically by the platform and after receiving an affirmative response to the prompt, the first user device and the second user device in the conference session.

2. The method of claim 1, wherein generating the conference session comprises:
   generating, automatically by the platform, a globally unique identifier (GUID) associated with the conference session; and
   wherein generating the conference session comprises allowing only the first user device and the second user device to join the conference session associated with the GUID.

3. The method of claim 1, further comprising:
   receiving, at the platform from a third user operating a third user device, a second selection of the URI;
   generating a globally unique identifier (GUID) associated with receipt of the second selection of the URI;
   generating a second conference session associated with the GUID;
   transmitting, automatically by the platform, a second message to the second user, the message indicating that the second conference session is initiated;
   receiving, by the platform, a second indication from the second user device that the second user joins the second conference session; and
   joining, automatically by the platform, the third user device and the second user device in the second conference session.

4. The method of claim 3, wherein the conference session comprises a first conference session, and further comprising:
   only including the second user device and the third user device in the second conference session; and
   only including the second user device and the first user device in the first conference session.

5. The method of claim 1, wherein generating the conference session unique to the first user and the second user comprises:
   responsive to receiving an indication of selection of the URI, executing pre-loaded code on the platform, the pre-loaded code executable to generate the conferencing session.

6. The method of claim 1, further comprising:
   prior to generating the conference session, transmitting to the first user device a question as a prompt; and
   responsive to receiving an answer to the prompt, modifying generation of the conference session based on the prompt.

7. The method of claim 1, further comprising:
   adding a tool to the conferencing session.

8. The method of claim 7, wherein the tool is selected from the group consisting of: a second URI to conduct electronic commerce with the second user, a link to begin an augmented reality session, a link to leave a video message, a link to leave an audio message, a link to record the session, a link to a scheduling calendar, a link to add an additional user device to the conferencing session, and combinations thereof.

9. A system comprising:
   a server;
   a data repository in communication with the server and storing:
      a uniform resource indicator (URI) unique to a second user operating a second user device, wherein a first user operating a first user device is different than the second user;
      computer readable program code for generating a plurality of conference sessions, including a conference session unique to the first user and the second user;
      a message indicating that the conference session is initiated;
      an indication from the second user device of the second user that the second user joins the conference session;
   a platform executable by the server to:
      receive from the first user device a selection of the URI;
      generate, in response to receiving the selection of the URI, the conference session;
      transmit the message to the second user;
      receive the indication;
      transmit, after receiving the indication from the second user device, a prompt to the first user device, wherein the prompt requests the first user to confirm that the first user joins the conference session; and
      join, after receiving an affirmative response to the prompt, the first user device and the second user device in the conference session.

10. The system of claim 9, wherein the platform is independent of the first user device and the second user device, and further wherein the first user device is video incompatible with the second user device.

11. The system of claim 9, wherein the first user device further comprises a first Web browser which presents the conference session on the first user device, and wherein the second user device further comprises a second Web browser which presents the conference session on the second user device.

12. The system of claim 9, wherein the platform is further configured to:
- generate, in response to receiving the URI additional times, multiple additional conference sessions among the plurality of conference sessions; and
- separate the conference session and the multiple additional conference sessions into distinctly different conference sessions using a plurality of globally unique identifiers (GUIDs).

\* \* \* \* \*